United States Patent [19]
Yoshida

[11] Patent Number: 5,895,909
[45] Date of Patent: Apr. 20, 1999

[54] CARD AND DEVICE FOR PROCESSING OF SAME

[75] Inventor: Hiroaki Yoshida, Hatoyama-machi, Japan

[73] Assignee: Kabushiki Kaisha Nippon Conlux, Tokyo, Japan

[21] Appl. No.: 08/733,424

[22] Filed: Oct. 18, 1996

[30] Foreign Application Priority Data

Oct. 19, 1995 [JP] Japan .................... 7-271507

[51] Int. Cl.⁶ .................... G06K 19/00
[52] U.S. Cl. .................... 235/487; 235/492
[58] Field of Search .................... 235/492, 487

[56] References Cited

U.S. PATENT DOCUMENTS

| 4,443,027 | 4/1984 | McNeeley et al. | 235/494 |
| 5,175,424 | 12/1992 | Lisimaque | 235/492 |

FOREIGN PATENT DOCUMENTS

| 60-207984 | 1/1962 | Japan. |
| 5-67250 | 5/1967 | Japan. |
| 6-139747 | 6/1968 | Japan. |
| 6-309511 | 7/1972 | Japan. |
| 62-194591 | 4/1978 | Japan. |
| 62-180491 | 3/1979 | Japan. |
| 7-65493 | 7/1984 | Japan. |
| 7-152884 | 6/1986 | Japan. |

Primary Examiner—Harold Pitts
Attorney, Agent, or Firm—Diller, Ramik & Wight, PC

[57] ABSTRACT

A hybrid card and a processing device capable of rapidly identifying a read/write unit corresponding to an IC module from a plurality of read/write units and preventing fraud in respect of the IC module. Identification data identifying the type of an IC module 11a is held in for example a magnetic stripe 11b outside the IC module 11a of a hybrid card 11. Authentication data corresponding to the identification data is held in the IC module 11a. An R/W unit adapted to the IC module 11a is selected in accordance with the identification data read from the location outside the IC module 11a. The identification data read from the location outside the IC module 11a and the authentication data contained in the data read from the IC module 11a are compared and, only if the two agree, the reading from or writing into the an IC read/write unit 130 is permitted.

11 Claims, 4 Drawing Sheets

5,895,909

CARD AND DEVICE FOR PROCESSING OF SAME

BACKGROUND OF THE INVENTION

1. Field of the Invention

The present invention relates to a card comprising an integrated circuit module (hereinbelow called an "IC module"), and more particularly to a card and processing device for it wherein the IC module can be rapidly read, while preventing fraudulent use.

2. Description of the Related Art

IC cards are conventionally known in which an IC module comprising an electrically rewritable non-volatile memory (hereinbelow called an "EEPROM") and microprocessor is incorporated in a plastic card.

Such IC cards are widely used for example in the management of personal information by banks on account of their properties of having larger memory capacity than conventional magnetic cards and of being able to be read and written repeatedly.

Recently in particular, hybrid cards have appeared in which the IC card incorporates in combination an optical memory unit whereby a larger quantity of information can be stored than can be stored in the IC module, and/or a magnetic stripe for convenient data reading.

However, the present situation is that standards regarding such IC modules have not yet been fully established. Specifically, although standards are being unified regarding the data transfer rate and mode of arrangement of contacts of the IC module, no steps have been taken to unify standards regarding clock pulse frequency etc.

Consequently, in a device such as a bank card reading device that handles not only its own cards but also cards issued by other organizations, there are installed beforehand in the interior of the device read/write units corresponding to each standard, and the type of card is usually identified by a "cut and try" system.

Such a cut and try system is a technique in which a read/write unit matching the card is sought by a process of trial and error. For example, issued Japanese Patent Publication (Kokoku) HEI 4-38080 discloses an IC card read/write device wherein clock pulses of a plurality of frequencies are generated from a single clock pulse generating means and if the output signal of the IC card is inappropriate the clock pulse generating means is changed over.

However, when a cut and try system typified by the prior art is employed, the problem arises that time is required in specifying the read/write unit corresponding to the IC module.

In particular, the number of times of trial and error increases with increase in the number of read/write units installed, so the time required for cut and try also increases.

As a result, when there are a large number of different read-write units, how to shorten the time for reading/writing the IC module has come to present a serious problem.

Also, with such IC modules, apart from the delay of the reading/writing time referred to above, there is a security problem.

In more detail, such an IC module is a self-complete type module that is capable of exchanging the data with the read/write unit by itself; furthermore, in general, the IC module can easily be fitted or removed, so this invites remodeling of the card by replacing the IC module with another IC module.

For this reason, consideration has been given to providing the IC module itself with a security mechanism such as a rewriting prevention function. However, it is not practicable to provide such a security mechanism for compact IC modules, which are of small size and light weight.

SUMMARY OF THE INVENTION

Accordingly, in order to solve the problems mentioned above, an object of the present invention is to provide an IC card and hybrid card (hereinbelow referred to generally as "card") whereby the read/write unit corresponding to the IC module can be rapidly specified from a plurality of read/write units, and whereby fraud in respect of the IC module can be prevented.

In order to achieve the above object, according to the present invention, a card on which is mounted an integrated circuit module comprising a rewritable memory and a processor, comprises a card type identification means whereby the type of card is identified, provided at a location other than the part where the integrated circuit module of the card is mounted.

The card may comprise a magnetic memory unit wherein the prescribed information is stored as residual magnetization at a location other than the part where the integrated circuit module is mounted; and the card type identification means may identify the type of the card based on the information stored in a partial memory region of the magnetic memory unit.

The card may comprise an optical memory unit wherein the prescribed information is optically stored in a location other than the part where the integrated circuit module is mounted; and the card type identification means may identify the type of the card based on the information stored in a partial memory region of the optical memory unit.

The card may comprise a mark written at a location other than the part where the integrated circuit module is mounted; and the card type identification means may identify the type of card using this mark.

The card may comprise a hole formed in a location other than the part where the integrated circuit module is mounted; and the card type identification means may identify the type of the card using this hole.

The card may comprise a notch formed in a location other than the part where the integrated circuit module is mounted; and the card type identification means may identify the type of the card using this notch.

Authentication information that authenticates the type of the card that was identified by the card type identification means may be stored in memory of the integrated circuit module.

Also according to the present invention a card processing device that performs reading/writing of information to a card wherein there is mounted an integrated circuit module comprising a rewritable memory and a processor may comprise identification information reading means that reads identification information indicating the type of the card from the card type identification means arranged at a location other than the part where the integrated circuit module of the card is mounted; and processing control means that executes processing in respect of the integrated circuit module using the identification information read by the identification information reading means.

The processing control means may change over the drive clock that is supplied to the integrated circuit module in accordance with the identification information read by the identification information reading means.

The processing control means may change over the protocol of processing in respect of the integrated circuit module in accordance with the identification information read by the identification information reading means.

Also, according to this invention, a card processing device that performs reading/writing of information in respect of a card on which is mounted an integrated circuit module comprising rewritable memory and a processor may comprise: identification information reading means that reads identification information indicating the type of the card from a card type identification means arranged at a location other than the part where the integrated circuit module of the card is mounted; processing control means that executes processing in respect of the integrated circuit module; and permission means that permits execution of processing in respect of the integrated circuit module under the control of the processing control means in accordance with the result of a comparison of the identification information read by the identification information reading means and authentication information stored in the memory of the card.

Thus, a card according to the present invention is constructed such that identification information indicating the type of integrated circuit module is held in a location other than that where the integrated circuit module is mounted, such as for example in a magnetic memory unit or optical memory unit, and such that authentication information corresponding to this identification information is held in a memory unit of the integrated circuit module; the benefits indicated below are thereby obtained.

1) The read/write unit corresponding to the integrated circuit module can be rapidly specified.
2) Fraud based on replacing the integrated circuit module can be detected at an early stage.

Also, since, with a card processing device according to the present invention, the type information indicating the type of this card is read from a card type identification means arranged at a location other than that where the card integrated circuit module is mounted and the construction is such that processing in respect of the integrated circuit module is implemented based on the identification information that is thus read, processing can be performed which is adapted to this integrated circuit module.

Also, since a card processing device according to the present invention is constituted such that the drive clock that is supplied to the integrated circuit module is changed over in accordance with the identification information that is read, changeover to a drive clock adapted to the integrated circuit module can be achieved smoothly.

Also, since a card processing device according to the present invention is constituted such that the protocol for processing the integrated circuit module is changed over in accordance with the identification information that is read, changeover to a protocol adapted to the integrated circuit module can be achieved smoothly.

Also, since a card processing device according to the present invention is constituted such that identification information indicating the type of card is read from a card type identification means (which is arranged at a location other than the location where the integrated circuit module of the card is mounted), and execution of processing in respect of the integrated circuit module is permitted in accordance with the result of comparing the identification information that is thus read with the authentication information stored in the memory of the card, fraudulent integrated circuit modules can be rejected.

DESCRIPTION OF THE PREFERRED EMBODIMENTS

A mode of implementing the present invention is described below with reference to the drawings. This mode of implementation is described for the case where the present invention is applied to a hybrid card and to a processing device for it.

Figure 1:
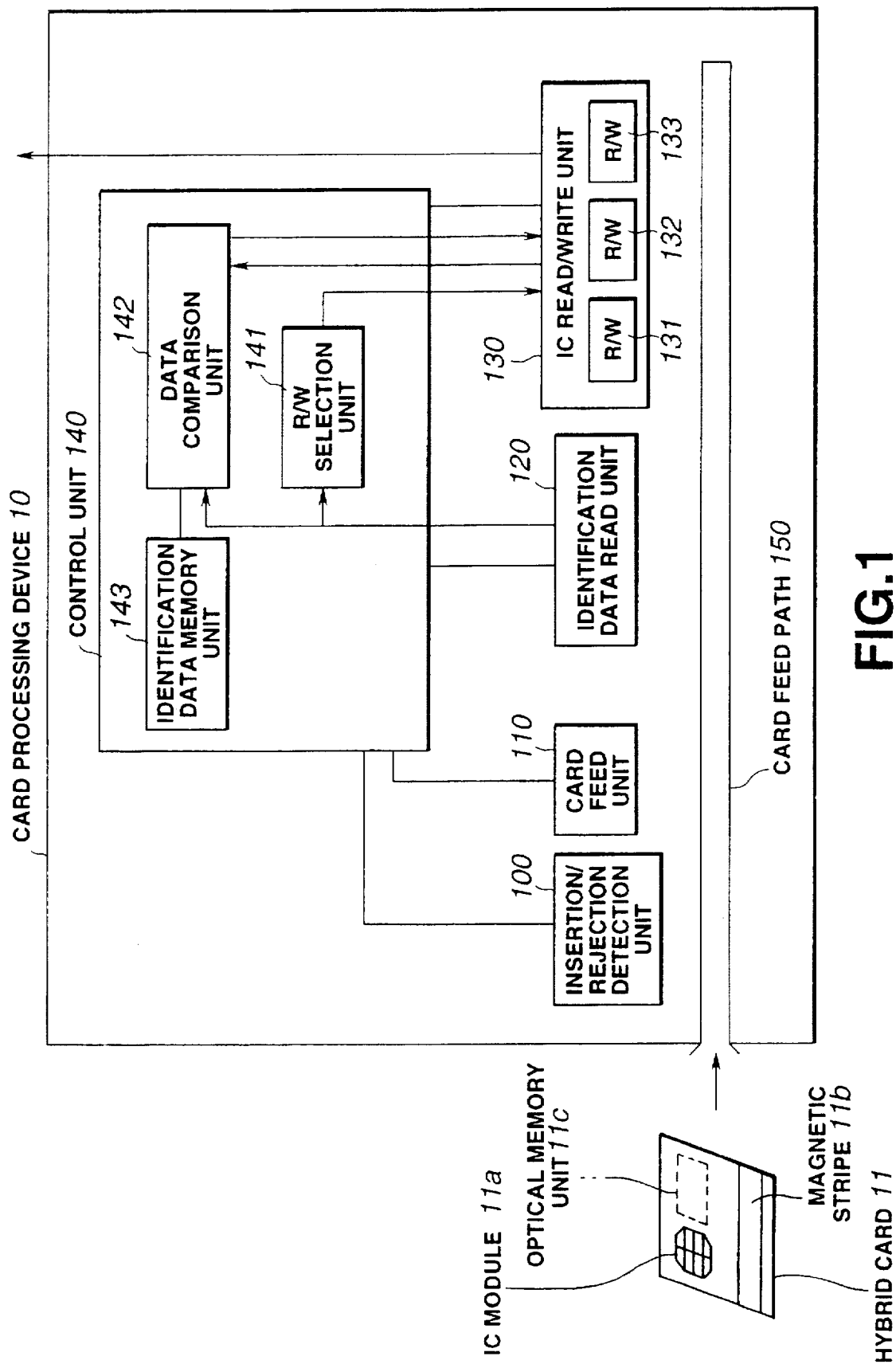
FIG. 1 is a block diagram illustrating the layout of a card processing device according to the present invention.

FIG. 1 is a view illustrating the construction of a card processing device 10 according to the present invention.

This card processing device 10 is equipped with a function of automatically selecting, from a plurality of read/write units (hereinbelow called "R/W units") an R/W unit adapted to the IC module of the hybrid card, and a function of automatically detecting a hybrid card having a fraudulent IC module.

Specifically, this card processing device 10 solves the processing delay for IC cards which previously presented a problem by automatic selection of the R/W unit, and forestalls remodeling of the IC card.

Specifically, identification data including the type of IC module 11a is held beforehand in a part other than IC module 11a of hybrid card 11, for example a magnetic stripe, optical memory unit or external shape; card processing device 10, by reading this identification data and selecting an R/W unit corresponding to this identification data, automatically selects an R/W unit adapted to IC module 11a.

Also, the identification data is held in an EEPROM of IC module 11a. Thus, by comparing the identification data held in IC module 11a with the identification data read from the portion other than IC module 11a, a check is performed establishing whether or not a fraudulently constituted IC module has been mounted in hybrid card 11.

For convenience in the description, the identification data stored in IC module 11a will be called "authentication data" in order to distinguish it from the identification data stored in the portion of hybrid card 11 other than IC module 11a.

Card processing device 10 shown in FIG. 1 comprises insertion/ejection detection unit 100, card feed unit 110, identification data reading unit 120, IC read/write unit 130, control unit 140, and card feed path 150.

Insertion/ejection detection unit 100 is a processing unit that detects the insertion condition of the hybrid card into a card insertion port and the ejection condition, and outputs the result of the detection to control unit 140. Card feed unit 110 is a processing unit that feeds an inserted hybrid card to a prescribed position along card feed path 150 under the control of control unit 140. In more detail, to read the identification data, it feeds hybrid card 11 to the position of identification data read unit 120, and, when data exchange with IC module 11a is to be performed, feeds hybrid card 11 to the position of the R/W unit.

Identification data read unit 120 is a processing unit that reads the identification data set in the portion of hybrid card 11 other than IC module 11a and outputs this to R/W selection unit 141 and data comparison unit 142 of control unit 140.

It should be noted that this identification data need not be held by a medium such as magnetic stripe 11b or optical memory unit 11c provided on hybrid card 11 but could be indicated by for example making a notch in part of the card.

IC read/write unit 130 is equipped with three different types of R/W unit 131 to 133 so that it can cope with IC modules of all the different standards that may be provided on hybrid card 11, and determines which R/W unit is to perform reading/writing in accordance with the result of the selection by R/W selection unit 141.

For example, in the case where hybrid card 11 may be fitted with an IC module that is actuated by a 3 MHz clock pulse or an IC module that is actuated by a 4 MHz clock pulse, an R/W unit that accesses data from a 3 MHz IC module and an R/W unit that accesses data from a 4 MHz IC module are provided within IC read/write unit 130, and which R/W unit is employed is determined in accordance with the type of this identification data.

Also, this IC read/write unit 130 reads the authentication data from the IC module 11a using the selected R/W unit, and outputs this authentication data to data comparison unit 140; reading/writing of IC data is then performed after obtaining access permission from data comparison unit 142.

It should be noted that, although the use of three R/W units 131 to 133 has been described, the number of these R/W units can be determined at will in accordance with the types of standards.

Control unit 140 performs control such as insertion detection and feed of hybrid card 11, and also has the functions of selecting an R/W unit corresponding to IC module 11a and of verifying the legitimacy of IC module 11a.

This control unit 140 is provided with an R/W selection unit 141, a data comparison unit 142, and an identification data memory unit 143.

R/W selection unit 141 is a processing unit that selects an R/W unit corresponding to IC module 11a from the three types of R/W units 131 to 133 provided within IC read/write unit 130, in accordance with the identification data read from the portion other than IC module 11a of hybrid card 11 by identification data read unit 120.

IC read/write unit 130 is therefore able to perform data exchange with IC module 11a using the R/W unit selected by this R/W selection unit 141, so there is no need to specify an R/W unit by trial and error using the cut and try system as conventionally.

Data comparison unit 142 is a processing unit that compares the identification data read by identification data read unit 120 with the authentication data read from IC module 11a of hybrid card 11 by IC read/write unit 130, and that, only if these two are the same, permits reading/writing of IC read/write unit 130.

That is, this data comparison unit 142 is provided in order to verify the legitimacy of IC module 11a of hybrid card 11 by comparing the identification data with the authentication data.

It should be noted that this data comparison unit 142 can perform temporary storage of the identification data, using an identification data memory unit 143 that stores identification data.

Thus, this control unit 140, using the identification data held in the portion of hybrid card 11 other than IC module 11a, selects an R/W unit corresponding to this IC module 11a, and compares the authentication data read by this R/W unit from IC module 11a with the identification data, to verify the legitimacy of the IC module.

Next, the processing sequence of card processing device 10 will be described.

Figure 2:
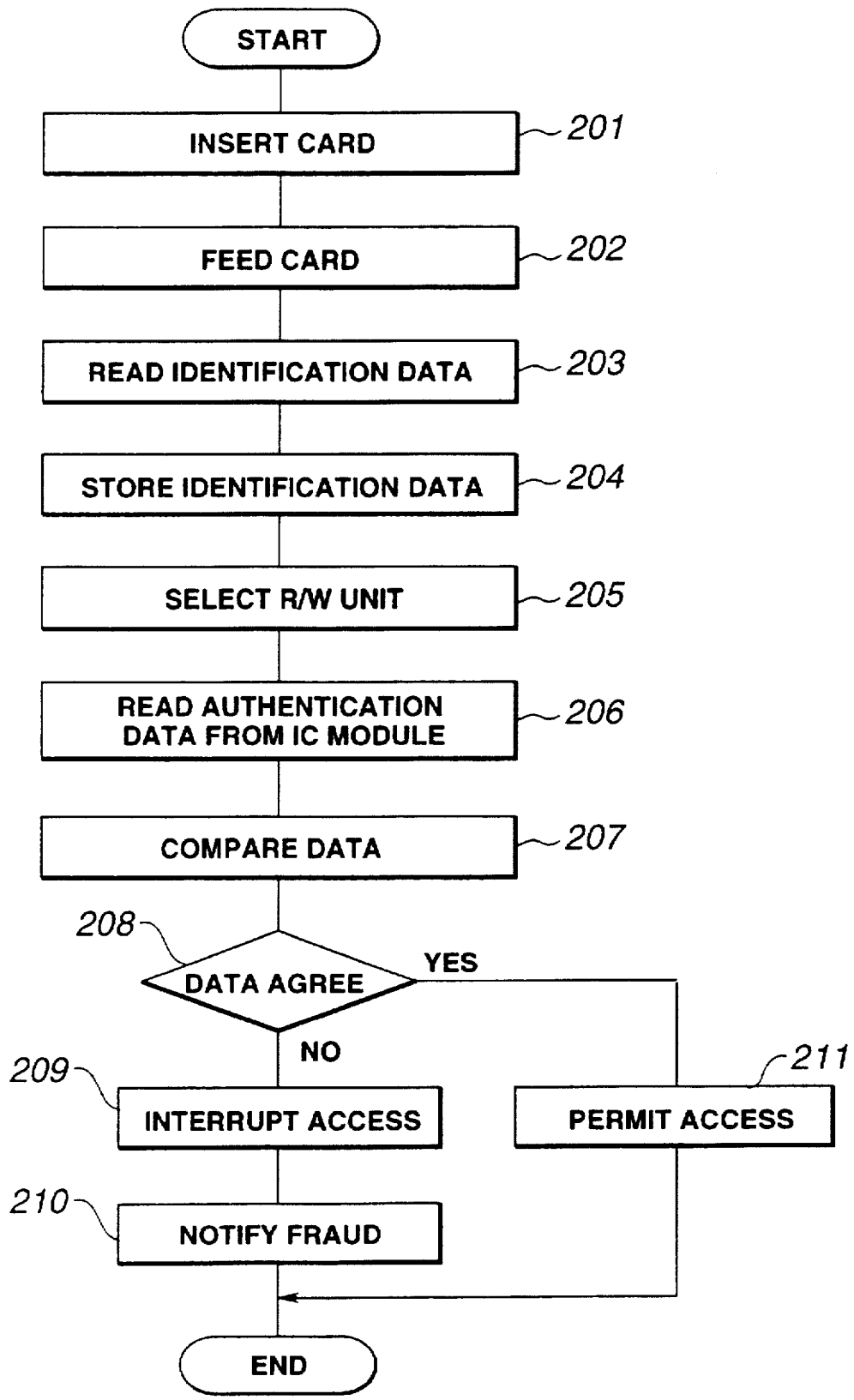
FIG. 2 is a flow chart illustrating the processing sequence of the card processing device of FIG. 1.

FIG. 2 is a flow chart showing the processing sequence of card processing device 10 shown in FIG. 1.

As shown in FIG. 2, when a hybrid card 11 is inserted into the card insertion port (step 201), this card processing device 10 feeds hybrid card 11 to the read position of the identification data along card feed path 150 (step 202). Identification data read unit 120 then reads the identification data (step 203).

For example, if the identification data is stored in magnetic stripe 11b of hybrid card 11, hybrid card 11 is fed to the position of a magnetic head, not shown; or if the identification data is stored in optical memory unit 11c of hybrid card 11, the hybrid card is fed to the position of an optical head, not shown.

Next, the identification data read by identification data read unit 120 is output to data comparison unit 142 and temporarily stored in identification data memory unit 143 (step 204); this identification data is then output to R/W selection unit 141.

R/W selection unit 141 now selects an R/W unit corresponding to the identification data, from the three R/W units 131 to 133 possessed by IC read/write unit 130, and informs IC read/write unit 130 of the results of the selection (step 205).

If IC read/write unit 130 does not possess an R/W unit corresponding to the identification data, hybrid card 11 is returned.

Next, using the R/W unit corresponding to the result of the selection by R/W selection unit 141, IC read/write unit 130 performs reading of the authentication data from IC module 11a of hybrid card 11 (step 206).

Data comparison unit 142 then compares this authentication data with the identification data stored in identification data storage unit 143 (step 207) and, if these two are not the same, treats the IC module 11a as a fraudulent model and instructs IC read/write unit 130 to interrupt access (steps 208 to 209), and executes display etc. to the effect that a fraud has been attempted (step 210). If these two are the same, access to IC read/write unit 130 is permitted (step 211).

By this series of processes, the IC module can be read using an R/W unit adapted to the type of IC module 11a of hybrid card 11, and occurrence of fraud regarding IC module 11a can be detected using the authentication data.

Next, an example of the construction of hybrid card 11 will be described.

Figure 3:
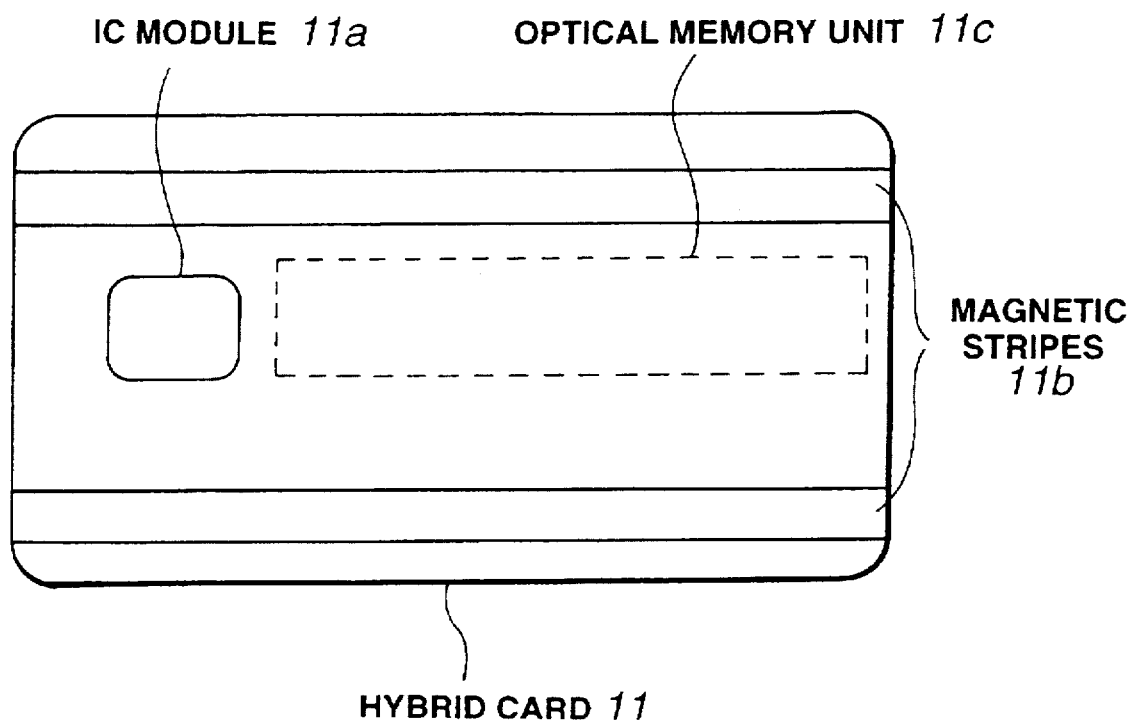
FIG. 3 is a view illustrating an example of the construction of a hybrid card shown in FIG. 1.

FIG. 3 is a view showing an example of the construction of hybrid card 11 shown in FIG. 1.

As shown in FIG. 3, this hybrid card 11 has a construction in which IC module 11a and magnetic stripe 11b are provided on the front face, while optical memory unit 11c indicated by the broken lines is provided on the back face.

IC module 11a is constituted by a single-chip MPU that is accessed by 8 terminal contacts and that incorporates an 8 K-byte EEPROM having a data area that stores the authentication data.

Magnetic stripe 11b is a medium that stores magnetically code numbers etc. just as in the case of a conventional magnetic card; in the present invention, it is assumed that identification data are stored in part of this magnetic stripe 11b and that the card processing device can specify the type of IC module using this identification data.

It should be noted that, as indicated in JISX 6301 specified in Japanese Industrial Standards, such a magnetic stripe 11b may be attached on both the top and bottom of the card, so identification data may be stored in either location.

Optical memory unit 11c is an optical device that additionally stores an enormous amount of data and has a storage capacity of about 40,000 times that of magnetic stripe 11b. Just as in the case of magnetic stripe 11b, the type of IC module 11a can be specified by storing identification data in part of this optical memory unit 11c.

Thus, a first characteristic of this hybrid card 11 is that identification data for identifying the type of IC module 11a is stored in some portion, such as magnetic stripe 11b or optical memory unit 11c, outside IC module 11a. It should be noted that, as mentioned, this identification data is data for specifying the type of IC module 11a.

Also, a second characteristic of this hybrid card 11 is that authentication data corresponding to the identification data is stored in IC module 11a. This authentication data is data for authenticating whether the IC module is legitimate or fraudulent, and will in principle be the same as the identification data.

However, it should be noted that, provided that it constitutes data corresponding to the identification data, data obtained by processing this identification data can be employed as authentication data. However, in this case, when performing the comparison, the data comparison unit 142 must decide the correspondence relationship between the authentication data and the identification data after these have been subjected to this process.

One example of the construction of a hybrid card 11 has been described, but, instead of being stored in magnetic stripe 11b or optical memory unit 11c, the identification data could be incorporated in the card using other means.

Accordingly, a case will next be described in which the identification data is physically incorporated in hybrid card 11.

FIGS. 4(a) to 4(d) are views showing methods of physically representing identification data on a hybrid card. In this case, the type of identification data i.e. of IC module 11a is indicated by a mark (FIG. 4(a)), presence and position of a hole (FIG. 4(b), presence and position of a notch (FIG. 4(c)) or external shape (FIG. 4(d)) etc.

Figure 4:
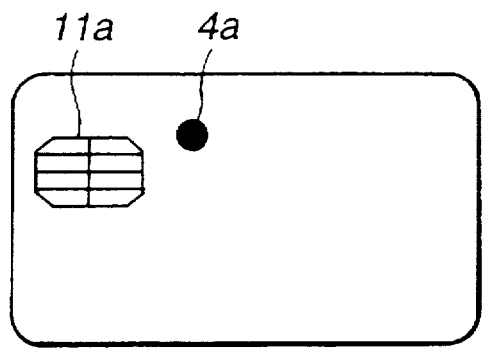
FIGS. 4(a) to 4(d) are views illustrating other constructions of the hybrid card shown in FIG. 1.
Figure 4:
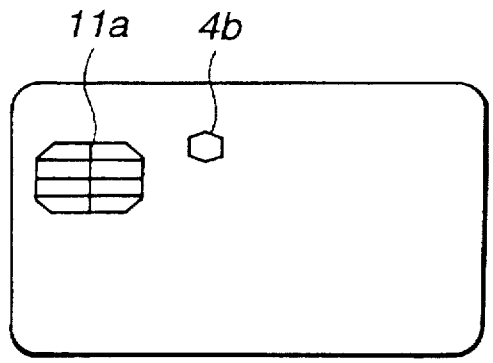
Figure 4:
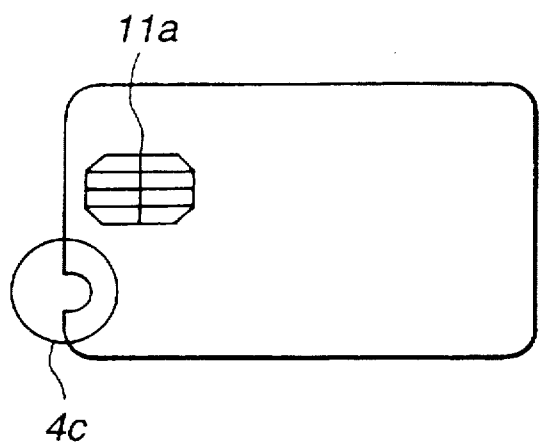
Figure 4:
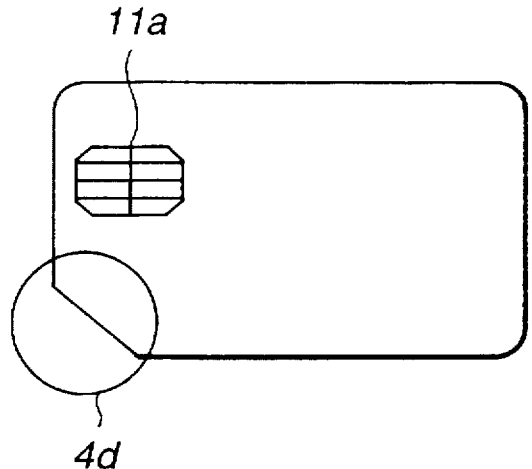

As shown in FIG. 4(a), if the type of IC module 11a is indicated by a mark 4a, by specifying the correspondence relationship of the type of IC module 11a and mark 4a beforehand, card processing device 10 can identify the type of IC module 11a in accordance with the presence and type of such mark. However, in this case, within the identification data reading unit 120 of card processing device 10, there must be provided a mechanism capable of identifying the type of mark that is read.

Also, as shown in FIG. 4(b), if the type of IC module 11a is indicated by presence and position of a hole 4b, by specifying the correspondence relationship of the type of IC module 11a and presence and position of an open hole beforehand, it is possible for card processing device 10 to identify the type of IC module 11a in accordance with the condition of this hole. However, in this case, a mechanism must be provided within the identification data reading unit 120 of card processing device 10 that is capable of recognizing the presence and position of a hole.

Also, as shown in FIG. 4(c), when the type of IC module 11a is indicated by a notch 4c, by specifying the correspondence relationship between the type of IC module 11a and notch beforehand, it is possible for card processing device 10 to identify the type of IC module 11a by means of the presence and type of such notch. However, in this case, it is necessary to provide a mechanism capable of recognizing the presence and type of notch within identification data read unit 120 of card processing device 10.

Also, as shown in FIG. 4(d) if the type of IC module 11a is indicated by external shape 4d, by specifying the correspondence relationship between the type of IC module 11a and external shape beforehand, it is possible for card processing device 10 to identify the type of IC module 11a by means of this external shape condition. However, in this case, it is necessary to provide a mechanism for recognizing differences in external shape within identification data reading unit 120 of card processing device 10.

In this way, the type of IC module 11a can be indicated using a physical method.

Since, as described above, in the present mode of implementation, identification data indicating the type of IC module 11a is held at a location outside IC module 11a of hybrid card 11, specifically, in magnetic stripe 11b, optical memory unit 11c or external shape 4a to 4d etc., and authentication data corresponding to this identification data is held in IC module 11a, an R/W unit corresponding to IC module 11a can be rapidly specified and fraud by replacing IC module 11a can be detected at an early stage.

Also, since, in the present mode of implementation, three R/W units are prepared respectively adapted for IC modules of different types, and an R/W unit is selected adapted for the IC module 11a in accordance with the identification data read from a location outside IC module 11a, an R/W unit adapted for IC module 11a can be rapidly specified.

Furthermore, with the present mode of implementation, fraud based on replacement of the IC module can be detected at an early stage thanks to the adoption of a construction in which the identification data read from a location other than IC module 11a and authentication data contained in data read from IC module 11a are compared, and reading/writing in respect of IC reading/writing unit 130 is permitted only if these two are the same.

It should be noted that although this mode of implementation has been described for the case of a hybrid card the present invention is not restricted to this and could be applied to any type of card having an IC module.

What is claimed is:

1. A card comprising an integrated circuit module defining a specific type card having a rewritable memory and a processor, card type identification information means for identifying the card as said specific type of card, and said card type identification information means being at a location of said card other than a location of the integrated circuit module.

2. A card according to claim 1, wherein the card comprises a magnetic memory unit wherein the prescribed information is stored as residual magnetization at a location other than the location where the integrated circuit module is located; and the card type identification information means identifies the type of card based on information stored in a partial memory region of the magnetic memory unit.

3. Card according to claim 1, wherein the card comprises an optical memory unit wherein prescribed information is optically stored in a location other than the part where the integrated circuit module is located; and the card type identification information means identifies the type of card based on information stored in a partial memory region of the optical memory unit.

4. A card according to claim 1, wherein the card comprises a mark written at a location other than the location where the integrated circuit module is located; and the card type identification information means identifies the type of card using this mark.

5. A card according to claim 1, wherein the card comprises a hole formed in a location other than the location where the integrated circuit module is located; and the card type identification location means identifies the type of card using this hole.

6. A card according to claim 1, wherein the card comprises a notch formed in a location other than the location where the integrated circuit module is located; and the card type identification information means identifies the type of card using this notch.

7. A card according to claim 1, wherein authentication information that authenticates the type of card that was identified by the card type identification information means is stored in a memory of the integrated circuit module.

8. A card processing device that performs reading/writing of information relative to a card including an integrated circuit module defining a specific type card having a rewritable memory and a processor, card type identification information means for identifying the card as the specific type of card, and the card type identification information means being at a location of the card other than a location of the integrated circuit module, comprising identification information reading means for reading the card type identification information means of a card to identify the specific type of card;

and processing control means for executing processing with respect to the integrated circuit module in response to the identification information means read by the identification information reading means.

9. A card processing device according to claim 8, wherein the processing control means changes over a drive clock that is supplied to the integrated circuit module in accordance with the identification information read by the identification information reading means.

10. A card processing device according to claim 8, wherein the processing control means changes over a protocol of processing with respect to the integrated circuit module in accordance with the identification information read by the identification information reading means.

11. A card processing device that performs reading/writing of information with respect to a card including an integrated circuit module defining a specific type card having a rewritable memory and a processor, card type identification information means for identifying the card as the specific type of card, and the card type identification information means being at a location of the card other than a location of the integrated circuit module, comprising:

identification information reading means for reading the card type identification information means of a card to identify the specific type of card;

processing control means for executing processing with respect to the integrated circuit module in response to the identification information means read by the identification information reading means; and permission means for permitting the processing by the processing control means of the integrated circuit module by a comparison of the card type identification information read by the identification information reading means and authentication information stored in the card rewritable memory.

* * * * *